US009873934B2

(12) United States Patent
Tanaka et al.

(10) Patent No.: US 9,873,934 B2
(45) Date of Patent: Jan. 23, 2018

(54) HOT-DIP GALVANIZED STEEL SHEETS AND GALVANNEALED STEEL SHEETS THAT HAVE GOOD APPEARANCE AND ADHESION TO COATING AND METHODS FOR PRODUCING THE SAME

(71) Applicant: JFE STEEL CORPORATION, Tokyo (JP)

(72) Inventors: Minoru Tanaka, Tokyo (JP); Yoshitsugu Suzuki, Tokyo (JP); Yasunobu Nagataki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 15/021,508

(22) PCT Filed: Sep. 11, 2014

(86) PCT No.: PCT/JP2014/004701
§ 371 (c)(1),
(2) Date: Mar. 11, 2016

(87) PCT Pub. No.: WO2015/037242
PCT Pub. Date: Mar. 19, 2015

(65) Prior Publication Data
US 2016/0222500 A1    Aug. 4, 2016

(30) Foreign Application Priority Data
Sep. 12, 2013    (JP) .................................. 2013-188919

(51) Int. Cl.
*C23C 2/40*    (2006.01)
*C23C 2/02*    (2006.01)
(Continued)

(52) U.S. Cl.
CPC .............. *C23C 2/40* (2013.01); *B32B 15/013* (2013.01); *C21D 1/52* (2013.01); *C21D 1/74* (2013.01);
(Continued)

(58) Field of Classification Search
CPC .... C23C 2/02; C23C 2/06; C23C 2/40; C23C 8/10; C23C 8/26; C23C 8/34;
(Continued)

(56) References Cited

U.S. PATENT DOCUMENTS

2010/0304183 A1\* 12/2010 Honda ..................... C21D 9/46
428/659
2013/0177780 A1   7/2013 Park et al.
2014/0234656 A1\* 8/2014 Fujita ........................ C23C 2/02
428/659

FOREIGN PATENT DOCUMENTS

CA    2839183    1/2013
CA    2850332    4/2013
(Continued)

OTHER PUBLICATIONS

International Search Report for International Application No. PCT/JP2014/004701 dated Nov. 4, 2014.
(Continued)

*Primary Examiner* — Jonathan Langman
(74) *Attorney, Agent, or Firm* — RatnerPrestia (57) ABSTRACT

A hot-dip galvanized steel sheet having a good appearance and good adhesion to a coating, the hot-dip galvanized steel sheet having a composition including, on a mass basis: C: 0.20% to 0.50%, Si: 0.1% to 3.0%, Mn: 0.5% to 3.0%, P: 0.001% to 0.10%, Al: 0.01% to 3.00%, and S: 0.200% or less, a remainder being Fe and incidental impurities, wherein the hot-dip galvanized steel sheet includes an internal oxidation layer and a decarburized layer, the internal oxidation (Continued)

layer having a thickness of 4 μm or less, the decarburized layer having a thickness of 16 μm or less, and 50% or more by area of the internal oxidation layer is composed of a Si oxide containing Fe and/or Mn represented by $Fe_{2X}Mn_{2-2X}SiO_Y$, wherein X ranges from 0 to 1, and Y is 3 or 4.

15 Claims, 2 Drawing Sheets

(51) Int. Cl.

| | | |
|---|---|---|
| C23C 2/06 | (2006.01) | |
| C21D 9/56 | (2006.01) | |
| C22C 18/04 | (2006.01) | |
| C22C 38/00 | (2006.01) | |
| C23C 8/10 | (2006.01) | |
| C23C 8/26 | (2006.01) | |
| C23C 8/34 | (2006.01) | |
| C21D 1/74 | (2006.01) | |
| C21D 1/76 | (2006.01) | |
| C21D 8/02 | (2006.01) | |
| C21D 1/52 | (2006.01) | |
| C21D 6/00 | (2006.01) | |
| C21D 9/46 | (2006.01) | |
| C22C 38/02 | (2006.01) | |
| C22C 38/04 | (2006.01) | |
| C22C 38/06 | (2006.01) | |
| C22C 38/22 | (2006.01) | |
| C22C 38/26 | (2006.01) | |
| C22C 38/28 | (2006.01) | |
| C22C 38/32 | (2006.01) | |
| C22C 38/34 | (2006.01) | |
| C22C 38/38 | (2006.01) | |
| C22C 38/42 | (2006.01) | |
| C22C 38/48 | (2006.01) | |
| C22C 38/50 | (2006.01) | |
| C22C 38/58 | (2006.01) | |
| C23C 2/28 | (2006.01) | |
| B32B 15/01 | (2006.01) | |
| C22C 18/00 | (2006.01) | |
| C22C 38/12 | (2006.01) | |
| C22C 38/14 | (2006.01) | |
| C22C 38/16 | (2006.01) | |
| C22C 38/20 | (2006.01) | |
| C22C 38/44 | (2006.01) | |
| C22C 38/54 | (2006.01) | |

(52) U.S. Cl.
CPC ............... *C21D 1/76* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/0278* (2013.01); *C21D 9/46* (2013.01); *C21D 9/56* (2013.01); *C21D 9/561* (2013.01); *C22C 18/00* (2013.01); *C22C 18/04* (2013.01); *C22C 38/00* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/20* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01); *C22C 38/42* (2013.01); *C22C 38/44* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/285* (2013.01); *C23C 8/10* (2013.01); *C23C 8/26* (2013.01); *C23C 8/34* (2013.01); *C21D 2211/004* (2013.01); *C21D 2211/005* (2013.01)

(58) Field of Classification Search
CPC .. C23C 2/285; C21D 9/56; C21D 1/74; C21D 1/76; C21D 8/0236; C21D 8/0247; C21D 9/561; C21D 1/52; C21D 9/46; C21D 8/0278; C21D 8/0263; C21D 8/0226; C21D 8/0205; C21D 6/008; C21D 6/005; C21D 6/004; C21D 221/004; C21D 221/005; C22C 18/04; C22C 38/00; C22C 38/38; C22C 38/32; C22C 38/28; C22C 38/26; C22C 38/22; C22C 38/06; C22C 38/04; C22C 38/02; C22C 38/002; C22C 38/58; C22C 38/50; C22C 38/48; C22C 38/42; C22C 38/34; C22C 18/00; C22C 38/12; C22C 38/14; C22C 38/16; C22C 38/20; C22C 38/44; C22C 38/54; B32B 15/013

See application file for complete search history.

(56) References Cited

FOREIGN PATENT DOCUMENTS

| CN | 101297051 A | 10/2008 | |
|---|---|---|---|
| CN | 101583734 A | 11/2009 | |
| CN | 102260842 A | 11/2011 | |
| EP | 1829983 A1 | 9/2007 | |
| EP | 1978113 A1 | 10/2008 | |
| EP | 2009129 | 12/2008 | |
| EP | 2112247 A1 | 10/2009 | |
| EP | 2762585 | 8/2014 | |
| JP | 04202630 | 7/1992 | |
| JP | 06306561 | 11/1994 | |
| JP | 20070291498 | 11/2007 | |
| JP | 2011117063 | 6/2011 | |
| JP | 2011214042 | 10/2011 | |
| JP | 2012251229 | 12/2012 | |
| KR | 1020100055389 | 5/2010 | |
| KR | 1020120075260 | 7/2012 | |
| WO | 2013047739 | 4/2013 | |
| WO | WO-2013-047804 | * 4/2013 | ............... C23C 2/06 |

OTHER PUBLICATIONS

Written Opinion of the International Searching Authority for International Application No. PCT/ JP2014/004701 dated Nov. 4, 2014.
Supplementary European Search Report for EP 14844872, dated Aug. 26, 2016, 15 pages.
Z. T. Zhang et al., Investigation of the Effect of Alloying Elements and Water Vapor Contents on the Oxidation and Decarburization of Transformation-Induced Plasticity Steels, The Minerals, Metals & Materials Society and ASM International 2009, Metallurgical and Materials Transactions B, Springer-Verlag, New York, vol. 40, No. 4, pp. 567-584, Jul. 3, 2009, 18 pages.
T. L. Baum et al., Kinetics of Oxidation and Decarburization in Al—Si Transformation Induced Plasticity Steel, The Minerals, Metals & Materials Society and ASM International 2007, Metallurgical and Materials Transactions B, Springer-Verlag, New York, vol. 38, No. 2, pp. 287-297, Mar. 27, 2007, 11 pages.
Non-Final Office Action fo U.S. Appl. No. 15/021,518, dated May 18, 2017—25 Pages 2017.
Chinese Office Action for Chinese Application No. 201480049959.2, dated Jan. 18, 2017, including Concise Statement of Search Report, 9 pages.

(56) References Cited

OTHER PUBLICATIONS

Korean Office Action for Korean Application No. 10-2016-7009598, dated Nov. 16, 2016, including Concise Statement of Relevance of Office Action, 6 pages.
Korean Office Action for Korean Application No. 10-2016-7009598, dated Jul. 24, 2017, including Concise Statement of Relevance of Office Action, 3 pages.
Chinese Office Action for Chinese Application No. 201480049959.2, dated Sep. 8, 2017 including Concise Statement of Relevance of Office Action, 5 pages.
U.S. Final Office Action for U.S. Appl. No. 15/021,518, dated Sep. 22, 2017, 10 pages.

* cited by examiner

HOT-DIP GALVANIZED STEEL SHEETS AND GALVANNEALED STEEL SHEETS THAT HAVE GOOD APPEARANCE AND ADHESION TO COATING AND METHODS FOR PRODUCING THE SAME

CROSS REFERENCE TO RELATED APPLICATIONS

This is the U.S. National Phase application of PCT International Application No. PCT/JP2014/004701, filed Sep. 11, 2014, and claims priority to Japanese Patent Application No. 2013-188919, filed Sep. 12, 2013, the disclosures of each of these applications being incorporated herein by reference in their entireties for all purposes.

FIELD OF THE INVENTION

The present invention relates to hot-dip galvanized steel sheets and galvannealed steel sheets that are based on Si-containing steel sheets and have a good appearance and good adhesion to the coating and methods for producing the hot-dip galvanized steel sheets and galvannealed steel sheets.

BACKGROUND OF THE INVENTION

In recent years, surface-treated steel sheets produced by rustproofing steel sheet materials, particularly rustproof hot-dip galvanized steel sheets and galvannealed steel sheets, have been used in the fields of automobiles, household electrical appliances, and construction materials.

In general, hot-dip galvanized steel sheets are produced by the following method. First, a slab is subjected to hot rolling, cold rolling, or heat treatment to form a thin steel sheet. The surface of the steel sheet is degreased and/or pickled in a pretreatment step. Alternatively, without the pretreatment step, oils on the surface of the steel sheet are burned in a preheating furnace. The steel sheet is then heated in a nonoxidizing or reducing atmosphere for recrystallization annealing. The steel sheet is then cooled in a nonoxidizing or reducing atmosphere to a temperature suitable for coating and is immersed in a hot-dip galvanizing bath without exposed to the air. The hot-dip galvanizing bath contains a minute amount of Al (approximately 0.1% to 0.2% by mass). Thus, the steel sheet is coated and becomes a hot-dip galvanized steel sheet. Galvannealed steel sheets are produced by heat-treating hot-dip galvanized steel sheets in an alloying furnace.

In recent years, in the automotive field, steel sheet materials have had higher performance and reduced weight. Strength reduction resulting from weight reduction of steel sheet materials is compensated for by the addition of solid-solution strengthening elements, such as Si and Mn. In particular, Si can advantageously reinforce steel without decreasing ductility. Thus, Si-containing steel sheets are promising high-strength steel sheets. However, the following problems occur in the production of hot-dip galvanized steel sheets and galvannealed steel sheets based on high-strength steel sheets containing large amounts of Si.

As described above, hot-dip galvanized steel sheets are annealed in a reducing atmosphere before coating. However, because of its high affinity for oxygen, Si in steel is selectively oxidized even in a reducing atmosphere and forms oxides on the surface of steel sheets. These oxides decrease the wettability of the surface of the steel sheets and form uncoated areas in a coating operation. Even when uncoated areas are not formed, these oxides decrease the adhesiveness of the coating.

Furthermore, these oxides significantly decrease the alloying speed in an alloying process after hot-dip galvanizing. This greatly decreases the production of galvannealed steel sheets. Alloying treatment at high temperatures for the purpose of high productivity may lower powdering resistance. Thus, it is difficult to achieve efficient production and high powdering resistance at the same time. Alloying treatment at high temperatures makes the retained austenite phase unstable and reduces the advantage of the addition of Si. Thus, it is very difficult to produce high-strength hot-dip galvanized steel sheets that have good mechanical characteristics and coating quality at the same time.

Several techniques are disclosed in order to address these problems. Patent Literature 1 discloses a technique for improving the wettability of a steel sheet to molten zinc by forming iron oxide on the surface of the steel sheet in an oxidizing atmosphere and then forming a reduced iron layer on the surface of the steel sheet by reduction annealing. Patent Literature 2 discloses a technique for ensuring high coating quality by controlling the atmosphere, such as the oxygen concentration, in a preheating operation. Patent Literature 3 discloses a technique of producing a hot-dip galvanized steel sheet that has no uncoated area and has good appearance by dividing the heating zone into three zones A to C and appropriately controlling the temperature and oxygen concentration of each of the heating zones to reduce the occurrence of indentation flaws.

CITATION LIST

Patent Literature

[PTL 1] Japanese Unexamined Patent Application Publication No. 4-202630

[PTL 2] Japanese Unexamined Patent Application Publication No. 6-306561

[PTL 3] Japanese Unexamined Patent Application Publication No. 2007-291498

SUMMARY OF THE INVENTION

In methods of hot-dip galvanizing high-Si-content steel using oxidation-reduction techniques as described in Patent Literature 1 and Patent Literature 2, although the formation of uncoated areas is suppressed, there is a problem of indentation flaws, which are defects characteristic of the oxidation-reduction techniques. A method for controlling the temperature and oxygen concentration of A to C heating zones as described in Patent Literature 3 can be used to produce hot-dip galvanized steel sheets free of surface defects, such as uncoated areas and indentation flaws. However, the oxide content of steel sheets varies with production conditions (production planning), and it is difficult to consistently produce steel sheets. More specifically, even if the heating zone temperatures are maintained constant, under certain production conditions (production planning), steel sheets may have an insufficient oxide content and have an uncoated area.

In view of such situations, it is an object of aspects of the present invention to provide hot-dip galvanized steel sheets and galvannealed steel sheets that have no surface defects and have a good appearance and good adhesion to the coating and methods for producing the hot-dip galvanized steel sheets and galvannealed steel sheets. The hot-dip galvanized steel sheets and galvannealed steel sheets are produced from high-Si-content steel sheets.

When a steel sheet is heated with a direct heating burner in a direct heating type furnace, it is known that the amount of oxide formed on the surface of the steel sheet depends on the furnace temperature or the mixing ratio of a combustible gas and a combustion-supporting gas. It is also known that external oxides are formed on the surface of ferrite (a steel sheet is hereinafter also referred to as ferrite) in a heating process. It is also known that internal oxides are formed inside the interface between ferrite and external oxides. The external oxides include $Fe_xMn_{1-x}O$, $Fe_{3X}Mn_{3-3X}O_4$, and $Fe_{2X}Mn_{2-2X}O_3$, wherein X ranges from 0 to 1. The internal oxides include $SiO_2$ and Si oxides containing Fe and/or Mn represented by $Fe_{2X}Mn_{2-2X}SiO_Y$, wherein X ranges from 0 to 1, and Y is 3 or 4. Examples of the Si oxides containing Fe and/or Mn represented by $Fe_{2X}Mn_{2-2X}SiO_Y$ include $Fe_2SiO_4$, $FeMnSiO_4$, $Mn_2SiO_4$, $FeSiO_3$, and $MnSiO_3$. In order to distinguish from $SiO_2$, Si oxides containing Fe and/or Mn represented by $Fe_{2X}Mn_{2-2X}SiO_Y$ are hereinafter also referred to simply as Si oxides containing Fe and/or Mn.

External oxides thus formed are reduced later in an annealing operation and form a reduced Fe layer on the surface of steel sheets, thereby effectively improving wettability to Zn coating and suppressing the formation of uncoated areas. Internal oxides, such as $SiO_2$ and Si oxides containing Fe and/or Mn, are effective in decreasing Si activity in steel, suppressing the enrichment of Si on the surface in an annealing operation, and suppressing the formation of uncoated areas.

The present inventors studied factors that have an influence on the oxidation behavior of high-Si-content steel sheets in addition to the furnace temperature and gas mixing ratio. When a steel sheet contains sufficient carbon, decarbonization occurs simultaneously with oxidation in the steel sheet and lowers oxygen potential in the steel sheet. Consequently, a reaction from $SiO_2$ to Si oxides containing Fe and/or Mn represented by $Fe_{2X}Mn_{2-2X}SiO_Y$ is promoted inside the interface between ferrite and external oxides.

Because ion diffusion in $SiO_2$ is slower than ion diffusion in Si oxides containing Fe and/or Mn, $SiO_2$ suppresses outward diffusion of Fe ions and Mn ions. This suppresses the formation of external oxides, such as $Fe_xMn_{1-x}O$, $Fe_{3X}Mn_{3-3X}O_4$, and $Fe_{2X}Mn_{2-2X}O_3$, formed by reactions between Fe and Mn and oxygen. Thus, it is difficult to form external oxides required to suppress the formation of uncoated areas by short-time heating, such as heating with a direct heating burner. Furthermore, internal oxides, such as $SiO_2$, formed by oxidation are exposed on a portion of the surface of annealed steel sheets not covered with a reduced Fe layer. $SiO_2$ on the surface acts as a starting point of an uncoated area that repels molten zinc and significantly affects the appearance of the galvanized surface.

In accordance with aspects of the present invention, a reaction from $SiO_2$ to Si oxides containing Fe and/or Mn is promoted as the oxygen potential decreases. Because Si oxides containing Fe and/or Mn have higher wettability to molten zinc than $SiO_2$, Si oxides containing Fe and/or Mn even exposed on the surface rarely act as starting points of uncoated areas.

The present inventors studied the heating conditions for stable formation of Si oxides containing Fe and/or Mn in a heat-treatment process including heating in a direct heating type furnace and annealing in a reducing atmosphere. It was found that Si oxides containing 50% or more by area of Fe and/or Mn can be consistently formed on the ferrite side from the interface between ferrite and a galvanized layer on a steel sheet having a carbon concentration in the range of 0.20% to 0.50% by mass by heating the steel sheet to a final surface temperature in the range of 550° C. to 750° C. by burning a combustible gas and a combustion-supporting gas, the concentration of CO and hydrocarbon gas in the combustible gas being 60% or less by volume, the concentration of $O_2$ in the combustion-supporting gas ranging from 20% to 40% by volume, and then heating the steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder. It was also found that steel sheets produced under these conditions include an internal oxidation layer having a thickness of 4 μm or less and a decarburized layer having a thickness of 16 μm or less. The term "internal oxidation layer", as used herein, refers to a region containing internal oxides in ferrite, more specifically, a region in which at least twice the average of oxygen peaks observed at a depth in the range of 50 to 60 μm is detected. The term "decarburized layer", as used herein, refers to a carbon deficient layer on the ferrite side from the interface between ferrite and a galvanized layer, more specifically, a region in which the carbon concentration is less than half the carbon concentration in the base material.

Aspects of the present invention are based on these findings and are summarized as follows:

[1] A hot-dip galvanized steel sheet having a good appearance and good adhesion to a coating, the hot-dip galvanized steel sheet having a composition comprising, on a mass basis: C: 0.20% to 0.50%, Si: 0.1% to 3.0%, Mn: 0.5% to 3.0%, P: 0.001% to 0.10%, Al: 0.01% to 3.00%, and S: 0.200% or less, a remainder being Fe and incidental impurities, wherein the hot-dip galvanized steel sheet includes an internal oxidation layer and a decarburized layer, the internal oxidation layer having a thickness of 4 μm or less on a ferrite side from an interface between ferrite and a galvanized layer, the decarburized layer having a thickness of 16 μm or less on the ferrite side from the interface between the ferrite and the galvanized layer, and 50% or more by area of the internal oxidation layer is composed of a Si oxide containing Fe and/or Mn represented by $Fe_{2X}Mn_{2-2X}SiO_Y$, wherein X ranges from 0 to 1, and Y is 3 or 4.

[2] The hot-dip galvanized steel sheet having a good appearance and good adhesion to a coating according to [1], further comprising Mo: 0.01% to 1.00% and/or Cr: 0.01% to 1.00% on a mass basis.

[3] The hot-dip galvanized steel sheet having a good appearance and good adhesion to a coating according to [1] or [2], further containing at least one of Nb: 0.005% to 0.20%, Ti: 0.005% to 0.20%, Cu: 0.01% to 0.50%, Ni: 0.01% to 1.00%, and B: 0.0005% to 0.010% on a mass basis.

[4] A galvannealed steel sheet having a good appearance and good adhesion to a coating according to any one of [1] to [3], wherein the galvanized layer is a galvannealed layer.

[5] A method for producing a hot-dip galvanized steel sheet having a good appearance and good adhesion to a coating, including in sequence the steps of: hot-rolling steel having the composition according to any one of [1] to [3], cold-rolling the resulting hot-rolled steel sheet; heating the steel sheet to a final surface temperature in the range of 550° C. to 750° C. by burning a combustible gas and a combustion-supporting gas with a direct heating burner in a direct heating type furnace, the combustible gas containing CO, a hydrocarbon gas, and a remainder, the CO and hydrocarbon gas constituting 60% or less by volume in total, the remainder being $H_2$, $N_2$, and incidental impurities, the combustion-supporting gas containing $O_2$ and a remainder, the $O_2$ constituting 20% to 40% by volume, the remainder being $N_2$ and incidental impurities; heating the steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder; and hot-dip galvanizing the steel sheet.

[6] A method for producing a galvannealed steel sheet having a good appearance and good adhesion to a coating according to [5], further including alloying the zinc coating after the hot-dip galvanizing.

In accordance with aspects of the present invention, hot-dip galvanized steel sheets and galvannealed steel sheets that have no surface defects, such as uncoated areas, and have a good appearance and good adhesion to the coating can be consistently produced from a high-Si-content steel sheet. Although it is generally believed that Si is difficult to hot-dip galvanizing, aspects of the present invention are effective for steel sheets containing 0.1% or more Si or steel sheets based on high-Si-content steel sheets and is useful as a method for significantly improving the yield in the production of high-Si-content hot-dip galvanized steel sheets.

BRIEF DESCRIPTION OF THE DRAWINGS

FIG. 2(a) illustrates the results with respect to surface appearance, and FIG. 2(b) illustrates the results with respect to the adhesiveness of the coating.

DETAILED DESCRIPTION OF EMBODIMENTS OF THE INVENTION

Exemplary embodiments of the present invention will be further described below.

The composition of steel sheets for use in accordance with aspects of the present invention will be described below. Unless otherwise specified, the percentages of the components are on a mass basis.

C: 0.20% to 0.50%

A C content of 0.20% or more is required to sufficiently promote the formation of Si oxides containing Fe and/or Mn by lowering oxygen potential through decarbonization. A C content of more than 0.50% results in poor weldability. Thus, the C content ranges from 0.20% to 0.50%.

Si: 0.1% to 3.0%

Si is the most important element to improve the mechanical characteristics of steel sheets. The Si content should be 0.1% or more. However, a Si content of more than 3.0% results in insufficient suppression of the formation of $SiO_2$-based oxides at the interface between ferrite and oxides, making it difficult to have the oxide content required to suppress the formation of uncoated areas. Thus, the Si content ranges from 0.1% to 3.0%.

Mn: 0.5% to 3.0%

Mn is a solid-solution strengthening element and is effective in reinforcing steel sheets. The Mn content should be 0.5% or more. A Mn content of more than 3.0% results in poor weldability and adhesion to the coating and makes it difficult to maintain the strength ductility balance.

Thus, the Mn content ranges from 0.5% to 3.0%.

P: 0.001% to 0.10%

P retards the precipitation and phase transformation of cementite. The P content is 0.001% or more. However, a P content of more than 0.10% results in poor weldability and adhesion to the coating. Furthermore, this retards alloying, increases the alloying temperature, and decreases ductility. Thus, the P content ranges from 0.001% to 0.10%.

Al: 0.01% to 3.00%

Al and Si are complementary to each other. Al is an inevitable contaminant in the steel production process. The lowest Al content is 0.01%. An Al content of more than 3.00% makes it difficult to suppress the formation of external oxides and results in poor adhesiveness of the coated layer. Thus, the Al content ranges from 0.01% to 3.00%.

S: 0.200% or Less

S is an element that is inevitably introduced in the steel production process. However, a high S content results in poor weldability. Thus, the S content is 0.200% or less.

In some embodiments of the present invention, in addition to these components, Mo and/or Cr may be further contained.

Mo: 0.01% to 1.00%

Mo is an element that controls the strength ductility balance. The Mo content may be 0.01% or more. Mo is effective in promoting internal oxidation of Si and Al and suppressing surface enrichment of Si and Al. However, a Mo content of more than 1.00% may result in increased costs. Thus, when Mo is contained, the Mo content preferably ranges from 0.01% to 1.00%.

Cr: 0.01% to 1.00%

Cr is an element that controls the strength ductility balance. The Cr content may be 0.01% or more. Like Mo, Cr is effective in promoting internal oxidation of Si and Al and suppressing surface enrichment of Si and Al. However, a Cr concentration of more than 1.00% results in surface enrichment of Cr and poor adhesion to the coating and weldability. Thus, when Cr is contained, the Cr content preferably ranges from 0.01% to 1.00%.

In some embodiments of the present invention, in addition to these components, the following elements may be contained in a manner that depends on the desired characteristics.

Nb: 0.005% to 0.20%

Nb is an element that controls the strength ductility balance. The Nb content may be 0.005% or more. However, a Nb content of more than 0.20% may result in increased costs. Thus, when Nb is contained, the Nb content preferably ranges from 0.005% to 0.20%.

Ti: 0.005% to 0.20%

Ti is an element that controls the strength ductility balance. The Ti content may be 0.005% or more. However, a Ti content of more than 0.20% may result in poor adhesion to the coating. Thus, when Ti is contained, the Ti content preferably ranges from 0.005% to 0.20%.

Cu: 0.01% to 0.50%

Cu is an element that promotes the formation of a retained austenite phase. The Cu content may be 0.01% or more. However, a Cu content of more than 0.5% may result in increased costs. Thus, when Cu is contained, the Cu content preferably ranges from 0.01% to 0.50%.

Ni: 0.01% to 1.00%

Ni is an element that promotes the formation of a retained austenite phase. The Ni content may be 0.01% or more. However, a Ni content of more than 1.00% may result in increased costs. Thus, when Ni is contained, the Ni content preferably ranges from 0.01% to 1.00%.

B: 0.0005% to 0.010%

B is an element that promotes the formation of a retained austenite phase. The B content may be 0.0005% or more. However, a B content of more than 0.010% may result in poor adhesion to the coating. Thus, when B is contained, the B content preferably ranges from 0.0005% to 0.010%.

The remainder is Fe and incidental impurities.

Internal oxides and a decarburized layer, which are important in accordance with aspects of the present invention, present on the ferrite side from the interface between ferrite and a galvanized layer will be described below.

In accordance with aspects of the present invention, there are an internal oxidation layer having a thickness of 4 μm or less and a decarburized layer having a thickness of 16 μm or less on the ferrite side from the interface between ferrite and a galvanized layer, and 50% or more by area of the internal oxide layer is composed of a Si oxide containing Fe and/or Mn.

Before hot-dip galvanizing treatment, a cold-rolled steel sheet is heated in a direct heating type furnace and then in a reducing atmosphere. In the direct heating type furnace, the surface of the steel sheet is heated with a direct heating burner. When the steel sheet contains sufficient carbon, decarbonization as represented by the following formula (1) occurs inside the steel sheet simultaneously with oxidation of the surface of the steel sheet due to heating with the direct heating burner. This decarbonization lowers oxygen potential in the steel sheet.

[Formula 1]

$$\underline{C} + \tfrac{1}{2}O_2 \rightarrow CO \qquad (1)$$

A decrease in oxygen potential promotes an equilibrium reaction by which a Si oxide containing Fe and/or Mn is formed from $SiO_2$ at the interface between external oxides and ferrite (see, for example, the following formula (2)).

[Formula 2]

$$Fe_{2X}Mn_{2-2X}O_3 + SiO_2 \leftrightarrows Fe_{2X}Mn_{2-2X}SiO_4 + 0.5O_2 \downarrow \qquad (2)$$

In accordance with aspects of the present invention, low oxygen potential due to decarbonization promotes the reaction represented by the formula (2) and efficiently promotes the formation of Si oxides containing Fe and/or Mn. Ion diffusion in Si oxides containing Fe and/or Mn is much faster than in $SiO_2$, and even short-time heating, such as heating with a direct heating burner, can achieve the oxide content required to suppress the formation of uncoated areas. $SiO_2$ restricts ion diffusion and makes it difficult to form external oxides required to suppress the formation of uncoated areas by short-time heating, such as heating with a direct heating burner. In accordance with aspects of the present invention, decarbonization promotes a reaction from $SiO_2$ to Si oxides containing Fe and/or Mn at the interface between ferrite and external oxides and thereby forms external oxides required to suppress the formation of uncoated areas.

Internal oxides, such as $SiO_2$, formed by oxidation are exposed on a portion of the surface of annealed steel sheets not covered with a reduced Fe layer. $SiO_2$ on the surface acts as a starting point of an uncoated area that repels molten zinc and significantly affects the appearance of the galvanized surface. In accordance with aspects of the present invention, a reaction from $SiO_2$ to Si oxides containing Fe and/or Mn is promoted as the oxygen potential decreases. Because Si oxides containing Fe and/or Mn have higher wettability to molten zinc than $SiO_2$, Si oxides containing Fe and/or Mn even exposed on the surface rarely act as starting points of uncoated areas. This therefore suppresses the formation of uncoated areas.

An excessive amount of internal oxides in steel sheets reduces the adhesiveness of a Zn coating. This is because a difference between the coefficient of thermal expansion of internal oxides and the coefficient of thermal expansion of ferrite causes a void at the interface between the internal oxides and ferrite in the production process, and the void acts as a starting point for the propagation of cracks. Si oxides containing Fe and/or Mn have a coefficient of thermal expansion closer to that of Fe than $SiO_2$ and therefore rarely cause a void between the internal oxides and ferrite. Thus, as in aspects of the present invention, promotion of a reaction from $SiO_2$ to Si oxides containing Fe and/or Mn improve the adhesiveness of a Zn coating.

The internal oxide layer has a thickness of 4 μm or less on the ferrite side from the interface between ferrite and a galvanized layer. A thickness of more than 4 μm results in poor adhesiveness of a Zn coating. The decarburized layer has a thickness of 16 μm or less on the ferrite side from the interface between the ferrite and the galvanized layer. A thickness of more than 16 μm makes it difficult to form a retained austenite phase and reduces the advantage of the addition of Si in mechanical characteristics.

Figure 1:
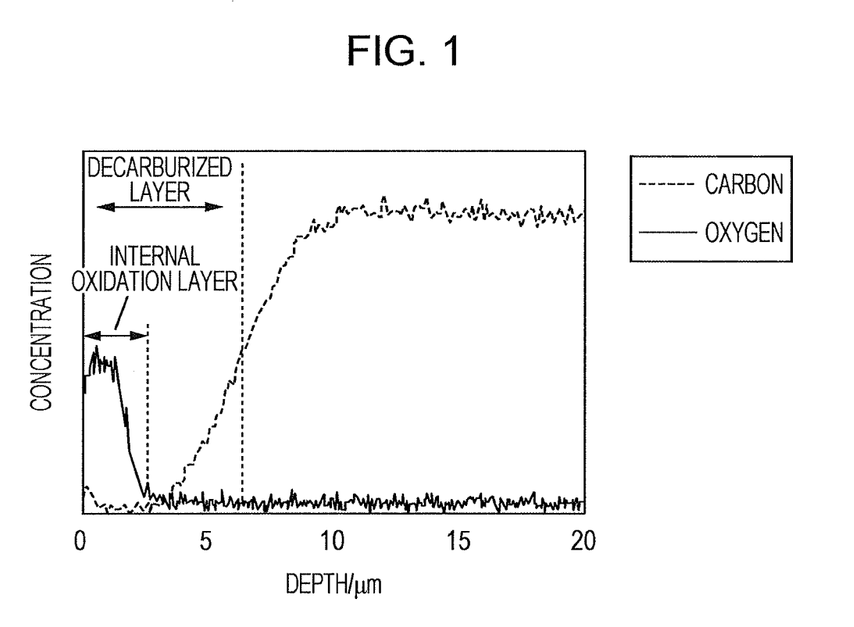
FIG. 1 is an exemplary concentration profile of carbon and oxygen in ferrite in a hot-dip galvanized steel sheet according to aspects of the present invention.

50% or more by area of the internal oxide layer is composed of a Si oxide acid containing Fe and/or Mn. An area percentage of less than 50% is insufficient to improve the coating appearance and adhesion by the formation of Si oxides containing Fe and/or Mn. FIG. 1 is an exemplary concentration profile of carbon and oxygen in ferrite in a hot-dip galvanized steel sheet according to aspects of the present invention.

Si oxides containing Fe and/or Mn can be identified by the composition analysis of Si, Mn, and Fe in the oxides by EDX of a cross-sectional microstructure observed by SEM. EPMA element mapping or TEM electron diffraction images may also be used for the identification. The area percentage in accordance with aspects of the present invention refers to the percentage of Si oxides containing Fe and/or Mn in the entire internal oxidation layer. The area percentage is determined by measuring the concentrations of Si, Mn, and Fe in internal oxides contained in ferrite by EPMA element mapping of a cross-sectional microstructure. An oxide having a Si content of 95% or more is considered to be $SiO_2$, and an oxide having a Si content of less than 95% is considered to be a Si oxide containing Fe and/or Mn. The area percentages of the internal oxidation layer, decarburized layer, and Si oxides containing Fe and/or Mn in accordance with aspects of the present invention can be controlled by adjusting the annealing conditions, the C content of steel, and the Si content of steel.

A method for producing a hot-dip galvanized steel sheet according to aspects of the present invention will be described below.

Steel having the composition described above is hot-rolled and then cold-rolled. The resulting steel sheet is then subjected to annealing and hot-dip galvanizing treatment in a direct heating type furnace equipped with a direct heating burner. If necessary, the hot-dip galvanizing treatment may be followed by alloying treatment.

Hot Rolling

The hot rolling may be performed under typical conditions.

Pickling

The hot rolling is preferably followed by pickling treatment. Mill scale formed on the surface is removed in a pickling process before cold rolling. The pickling conditions are not particularly limited.

Cold Rolling

The cold rolling is preferably performed at a rolling reduction in the range of 30% to 90%. A rolling reduction of less than 30% often results in poor mechanical characteristics due to slow recrystallization. On the other hand, a rolling reduction of more than 90% results in not only increased rolling costs but also poor coating characteristics due to increased surface enrichment in an annealing operation.

The annealing conditions for the formation of internal oxides and a decarburized layer, which are important in accordance with aspects of the present invention, will be described below. The annealing is a heat-treatment process including heating in a direct heating type furnace and then heating in a reducing atmosphere.

In accordance with aspects of the present invention, a steel sheet is heated in a direct heating type furnace after the cold rolling. More specifically, the surface of the steel sheet is heated with a direct heating burner in a direct heating type furnace. The steel sheet is heated to a final surface temperature in the range of 550° C. to 750° C. A final surface temperature of 550° C. or less results in a deficiency of oxides required to suppress the formation of uncoated areas. On the other hand, a final surface temperature of 750° C. or more results in an excessive amount of oxides and causes defects called indentation flaws on the surface. Thus, the final surface temperature ranges from 550° C. to 750° C.

Heating in a direct heating type furnace is performed in an atmosphere having low carbon and oxygen potential. More specifically, the steel sheet is heated by burning a combustible gas and a combustion-supporting gas with a direct heating burner in a direct heating type furnace, the combustible gas containing CO, a hydrocarbon gas, and a remainder, the CO and hydrocarbon gas constituting 60% or less by volume in total, the remainder being $H_2$, $N_2$, and incidental impurities, the combustion-supporting gas containing $O_2$ and a remainder, the $O_2$ constituting 20% to 40% by volume, the remainder being $N_2$ and incidental impurities. Under conditions outside the conditions described above, decarbonization cannot sufficiently lower the oxygen potential at the interface between ferrite and oxides.

Heating a steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder After heating with the direct heating burner, the steel sheet is heated (annealed) at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder. This is performed in order to reduce the surface of the steel sheet. For sufficient reducing ability, the hydrogen concentration should be 5% by volume or more. However, a hydrogen concentration of 30% by volume or more results in high operating costs. A water vapor concentration of 0.060% by volume or more results in promoted decarbonization by $H_2O$ in an annealing operation, and the decarburized layer has a thickness of more than 16 μm. An excessively thick decarburized layer makes it difficult to form a retained austenite phase and reduces the advantage of the addition of Si. Thus, the annealing atmosphere has a hydrogen concentration in the range of 5% to 30% by volume and a water vapor concentration of 0.060% or less by volume.

In the atmosphere described above, the steel sheet is heated at a soaking temperature in the range of 630° C. to 850° C. for reduction annealing. A final steel sheet temperature of 630° C. or less results in poor mechanical characteristics due to slow recrystallization. A final steel sheet temperature of more than 850° C. results in the formation of uncoated areas due to surface enrichment of Si and the like.

The annealing is followed by hot-dip galvanizing treatment. The hot-dip galvanizing treatment may be followed by alloying treatment, if necessary.

The temperatures of a Zn bath in the hot-dip galvanizing treatment and alloying treatment preferably range from 440° C. to 550° C. A bath temperature of less than 440° C. may disadvantageously result in solidification of Zn due to large variations in the bath temperature. On the other hand, a bath temperature of more than 550° C. results in rapid evaporation of components in the Zn bath and increased operating costs or pollution of the operating environment due to evaporation from the Zn bath. This also tends to result in over-alloying because alloying proceeds while the steel sheet is immersed in the Zn bath.

Without alloying treatment, it is desirable that the concentration of Al in the bath range from 0.14% to 0.24% by mass. An Al concentration of less than 0.14% by mass results in an uneven appearance due to an Fe—Zn alloying reaction in a coating operation. An Al concentration of more than 0.24% by mass results in poor weldability because a thick Fe—Al alloy layer is formed at the interface between the galvanized layer and ferrite during the coating treatment. This high concentration of Al in the bath also results in deposition of a large amount of Al oxide film on the surface of the steel sheet and a very poor surface appearance.

When the hot-dip galvanizing treatment is followed by alloying treatment, it is desirable that the concentration of Al in the bath range from 0.10% to 0.20% by mass. An Al concentration of less than 0.10% by mass results in poor adhesion to the coating because a hard and brittle Fe—Zn alloy layer is formed at the interface between the galvanized layer and ferrite in a coating operation. An Al concentration of more than 0.20% by mass results in poor weldability because a thick Fe—Al alloy layer is formed at the interface between the galvanized layer and ferrite immediately after immersion in the bath.

Mg may be added to the Zn bath in order to improve corrosion resistance.

When the hot-dip galvanizing treatment is followed by alloying treatment as required, the alloying temperature is preferably 460° C. or more and less than 570° C. An alloying temperature of 460° C. or less results in a slow alloying reaction. An alloying temperature of 570° C. or more results in poor coating characteristics because a thick, hard and brittle Fe—Zn alloy layer is formed at the coated layer/ferrite interface. The amount of coating is not particularly limited. The amount of coating is preferably 10 g/m² or more in terms of corrosion resistance and the control of the amount of coating and is preferably 120 g/m² or less in terms of workability and from an economic point of view.

Example 1

Aspects of the present invention will be more specifically described in the following examples.

A slab having a steel composition listed in Table 1 was heated in a furnace at 1250° C. for 60 minutes, was hot-rolled to 2.8 mm, and was coiled at 530° C. The steel sheet was then pickled to remove mill scale and was cold-rolled to 1.2 mm at a rolling reduction of 50%. The steel sheet was then subjected to heat treatment (annealing) under the conditions listed in Table 2 in a CGL having a direct heating (DFF) type heating zone. Subsequently, the steel sheet was immersed in a Zn bath containing Al at 460° C. for hot-dip galvanizing treatment to produce a hot-dip galvanized steel sheet (coating type: GI). Some of the steel sheets were subjected to alloying treatment after the hot-dip galvanizing treatment to produce galvannealed steel sheets (coating type: GA). The concentration of Al in the bath ranged from 0.10% to 0.20% by mass, and the amount of coating was adjusted to be 45 g/m² by gas wiping. The alloying treatment was performed at a temperature in the range of 550° C. to 560° C.

(1) Surface Appearance

A 300 mm×300 mm area was visually inspected. The surface appearance was rated according to the following criteria:

○ (Circle): No uncoated area or indentation flaws

Δ (Triangle): Generally good except for a few uncoated areas or indentation flaws x (Cross): Poor appearance with uncoated areas or indentation flaws

TABLE 1

| | Composition of specimen/mass % | | | | | | | | | | | | | |
|---|---|---|---|---|---|---|---|---|---|---|---|---|---|---|
| Steel type | C | Si | Mn | P | Al | S | Mo | Cr | Nb | Ti | Cu | Ni | B | Remarks |
| A | 0.22 | 0.9 | 1.1 | 0.04 | 0.65 | 0.010 | — | — | — | — | — | — | — | Within scope of invention |
| B | 0.45 | 0.4 | 1.4 | 0.08 | 1.05 | 0.030 | — | — | — | — | — | — | — | Within scope of invention |
| C | 0.26 | 2.2 | 0.8 | 0.03 | 0.01 | 0.005 | 0.20 | 0.06 | — | — | — | — | — | Within scope of invention |
| D | 0.44 | 0.5 | 0.5 | 0.02 | 0.09 | 0.001 | 0.01 | — | — | — | — | — | — | Within scope of invention |
| E | 0.30 | 0.9 | 2.6 | 0.06 | 0.04 | 0.004 | — | 0.10 | — | — | — | — | — | Within scope of invention |
| F | 0.35 | 1.4 | 2.1 | 0.04 | 0.05 | 0.020 | — | 0.25 | 0.01 | — | — | — | 0.002 | Within scope of invention |
| G | 0.21 | 2.1 | 1.4 | 0.02 | 0.20 | 0.015 | 0.06 | 0.07 | — | 0.05 | — | — | — | Within scope of invention |
| H | 0.37 | 0.3 | 1.5 | 0.06 | 1.90 | 0.007 | 0.05 | — | — | — | — | — | 0.002 | Within scope of invention |
| I | 0.48 | 2.6 | 1.9 | 0.03 | 2.10 | 0.003 | — | 0.06 | 0.08 | 0.06 | 0.01 | 0.02 | — | Within scope of invention |
| J | 0.23 | 1.1 | 0.7 | 0.02 | 1.10 | 0.015 | 0.06 | 0.20 | 0.10 | 0.08 | — | — | — | Within scope of invention |
| K | 0.11 | 1.1 | 0.8 | 0.06 | 0.08 | 0.008 | 0.04 | 0.09 | 0.06 | — | — | — | — | Outside scope of invention |
| L | 0.56 | 2.3 | 1.8 | 0.03 | 0.20 | 0.001 | — | 0.06 | — | 0.02 | — | 0.08 | — | Outside scope of invention |
| M | 0.34 | 4.0 | 3.6 | 0.08 | 1.50 | 0.006 | 0.08 | — | 0.07 | 0.07 | — | 0.06 | — | Outside scope of invention |
| N | 0.12 | 2.0 | 0.5 | 0.02 | 3.60 | 0.002 | 0.45 | 1.20 | — | 0.12 | — | — | 0.001 | Outside scope of invention |
| O | 0.18 | 0.8 | 1.9 | 0.05 | 0.40 | 0.020 | 1.55 | 3.50 | 0.04 | — | 0.05 | 0.04 | 0.003 | Outside scope of invention |
| P | 0.54 | 0.7 | 2.0 | 0.04 | 0.50 | 0.030 | 0.35 | 2.50 | 0.04 | 0.10 | 0.03 | 0.06 | 0.001 | Outside scope of invention |

The surface appearance and adhesiveness of the coating of the hot-dip galvanized steel sheets thus produced were evaluated by the following method. After the galvanized layer was removed, the composition in the depth direction was analyzed with a glow discharge spectrometer (GDS), and the thicknesses of the internal oxidation layer and decarburized layer were determined. More specifically, a region in which at least twice the average of oxygen peaks observed at a depth in the range of 50 to 60 μm was detected was considered to be an internal oxidation layer. A region in which less than half the average of carbon peaks observed at a depth in the range of 50 to 60 μm was detected was considered to be a decarburized layer. The area percentage of Si oxides containing Fe and/or Mn was determined by cross-sectional EPMA element mapping. More specifically, the concentrations of Si, Mn, and Fe in internal oxides contained in the ferrite were determined. An oxide having a Si content of 95% or more was considered to be $SiO_2$, and an oxide having a Si content of less than 95% was considered to be a Si oxide containing Fe and/or Mn.

The following are evaluation criteria for the surface appearance and adhesiveness of the coating.

(2) Adhesiveness of Coating

A cellophane adhesive tape was applied to a coated surface. The tape surface was bent 90° C. and bent back. A cellophane adhesive tape having a width of 24 mm was applied to the inside of the processed portion (compressed side) parallel to the bent portion and was removed. The amount of zinc deposited on a portion of the cellophane adhesive tape having a length of 40 mm was measured as a Zn count by a fluorescent X-ray method and was converted into the amount of peeled zinc per unit length (1 m), which was evaluated according to the following criteria. The mask diameter was 30 mm, the accelerating voltage and accelerating current of fluorescent X-rays were 50 kV and 50 mA, and the measurement time was 20 seconds.

○ (Circle): The Zn count was 0 or more and less than 5000.

Δ (Triangle): The Zn count was 5000 or more and less than 10000.

x (Cross): The Zn count was 10000 or more.

Table 2 shows the results.

TABLE 2

| | | Heat treatment conditions | | | | | | Inside of ferrite | |
|---|---|---|---|---|---|---|---|---|---|
| | | | Oxygen in | | | | | | |
| Steel sheet No. | Steel type | DFF temperature/ ° C. | Hydrocarbon in combustible gas/vol % | combustion-supporting gas/vol % | $H_2$/vol % | $H_2O$/vol % | Soaking temperature/ ° C. | Decarburized layer/μm | Internal oxidation layer/μm |
| 1 | A | 680 | 54 | 21 | 10 | 0.010 | 820 | 6 | 0.6 |
| 2 | A | 715 | 46 | 26 | 12 | 0.050 | 820 | 12 | 1.5 |
| 3 | A | 500 | 45 | 26 | 12 | 0.020 | 820 | 10 | 0.8 |
| 4 | A | 820 | 52 | 21 | 9 | 0.010 | 810 | 24 | 0.5 |
| 5 | B | 580 | 35 | 20 | 16 | 0.030 | 680 | 8 | 3.3 |
| 6 | B | 705 | 48 | 38 | 8 | 0.010 | 800 | 14 | 2.1 |

TABLE 2-continued

| | | | | | | | | | |
|---|---|---|---|---|---|---|---|---|---|
| 7 | B | 740 | 85 | 21 | 10 | 0.050 | 810 | 7 | 2.0 |
| 8 | B | 700 | 52 | 30 | 2 | 0.010 | 810 | 25 | 4.8 |
| 9 | C | 650 | 50 | 21 | 18 | 0.025 | 800 | 10 | 1.5 |
| 10 | C | 590 | 50 | 5 | 8 | 0.020 | 790 | 5 | 0.5 |
| 11 | D | 690 | 35 | 34 | 26 | 0.035 | 820 | 4 | 3.5 |
| 12 | D | 730 | 40 | 35 | 10 | 0.200 | 790 | 30 | 5.8 |
| 13 | E | 720 | 58 | 25 | 22 | 0.040 | 830 | 10 | 0.9 |
| 14 | E | 710 | 45 | 21 | 15 | 0.150 | 810 | 18 | 4.2 |
| 15 | F | 730 | 36 | 36 | 10 | 0.055 | 830 | 3 | 1.8 |
| 16 | F | 520 | 55 | 25 | 6 | 0.010 | 800 | 10 | 0.8 |
| 17 | G | 690 | 45 | 21 | 15 | 0.030 | 820 | 15 | 2.5 |
| 18 | H | 710 | 51 | 21 | 20 | 0.010 | 790 | 5 | 1.2 |
| 19 | I | 590 | 42 | 21 | 7 | 0.015 | 820 | 7 | 3.4 |
| 20 | J | 700 | 53 | 32 | 13 | 0.020 | 820 | 9 | 2.8 |
| 21 | K | 720 | 51 | 35 | 12 | 0.050 | 800 | 20 | 4.5 |
| 22 | L | 690 | 48 | 21 | 12 | 0.015 | 810 | 5 | 2.2 |
| 23 | M | 710 | 50 | 21 | 15 | 0.030 | 800 | 8 | 2.3 |
| 24 | N | 700 | 55 | 30 | 20 | 0.001 | 820 | 22 | 4.6 |
| 25 | O | 740 | 45 | 21 | 10 | 0.020 | 810 | 12 | 1.7 |
| 26 | P | 680 | 50 | 30 | 15 | 0.020 | 820 | 28 | 5.8 |

| Steel sheet No. | Inside of ferrite Area percentage of Si oxides containing Fe and/or Mn/% | Coating type | Surface appearance | Adhesion | Remarks |
|---|---|---|---|---|---|
| 1 | 58.0 | GA | ○ | ○ | Example |
| 2 | 85.0 | GI | ○ | ○ | Example |
| 3 | 25.0 | GI | X | Δ | Comparative example |
| 4 | 52.0 | GA | Δ | X | Comparative example |
| 5 | 60.0 | GI | ○ | ○ | Example |
| 6 | 68.0 | GA | ○ | ○ | Example |
| 7 | 30.0 | GI | Δ | X | Comparative example |
| 8 | 60.0 | GA | X | Δ | Comparative example |
| 9 | 82.0 | GA | ○ | ○ | Example |
| 10 | 15.0 | GA | Δ | X | Comparative example |
| 11 | 55.0 | GI | ○ | ○ | Example |
| 12 | 81.0 | GI | X | Δ | Comparative example |
| 13 | 78.0 | GI | ○ | ○ | Example |
| 14 | 60.0 | GA | X | X | Comparative example |
| 15 | 56.0 | GA | ○ | ○ | Example |
| 16 | 15.0 | GA | X | Δ | Comparative example |
| 17 | 75.0 | GI | ○ | ○ | Example |
| 18 | 65.0 | GA | ○ | ○ | Example |
| 19 | 90.0 | GA | ○ | ○ | Example |
| 20 | 60.0 | GI | ○ | ○ | Example |
| 21 | 60.0 | GA | Δ | X | Comparative example |
| 22 | 25.0 | GA | X | Δ | Comparative example |
| 23 | 32.0 | GA | Δ | X | Comparative example |
| 24 | 65.0 | GI | X | X | Comparative example |
| 25 | 40.0 | GI | X | Δ | Comparative example |
| 26 | 68.0 | GA | X | X | Comparative example |

Figure 2:
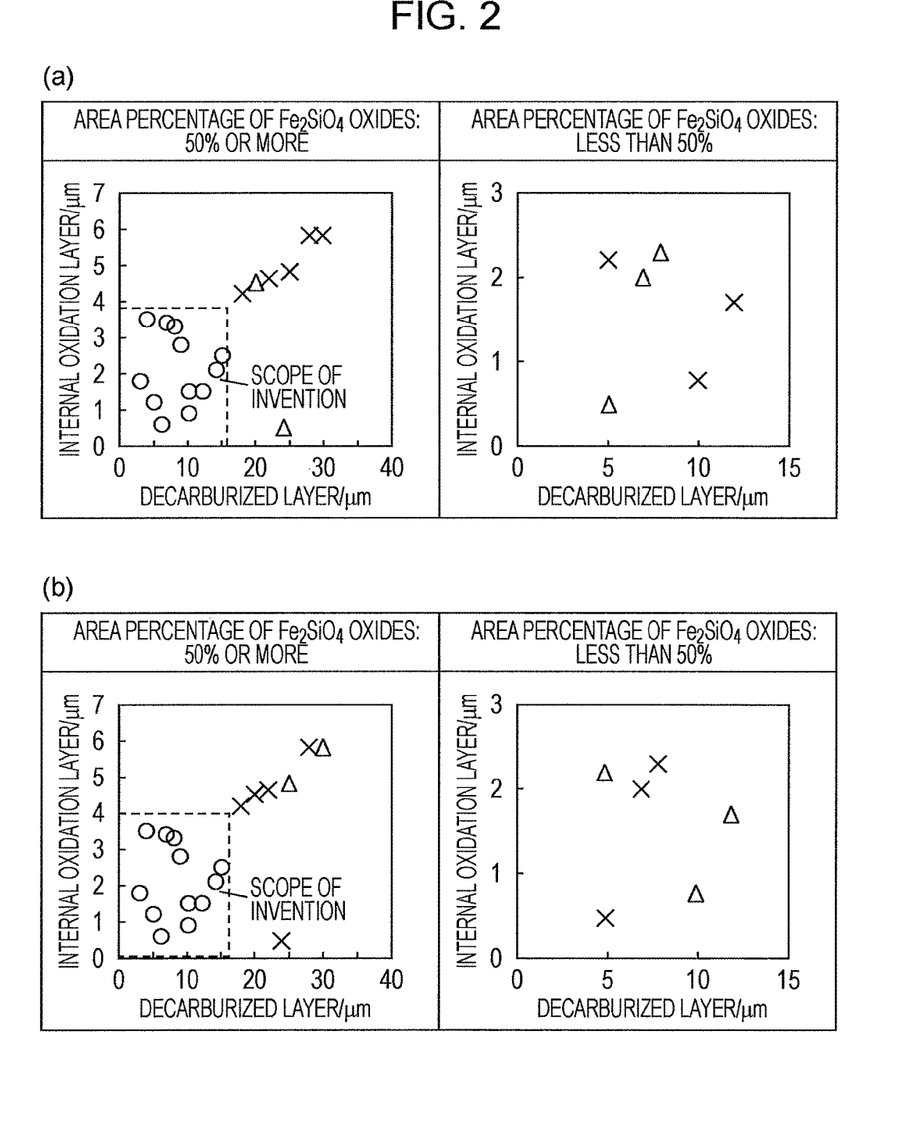
FIG. 2 summarizes the results listed in Table 2 in Examples.

The results in Table 2 were summarized in FIG. 2. FIG. 2(a) illustrates the results with respect to the surface appearance, and FIG. 2(b) illustrates the results with respect to the adhesiveness of the coating. The surface of hot-dip galvanized steel sheets (examples) having a 4 μm or less internal oxidation layer and a 16 μm or less decarburized layer, 50% or more by area of the internal oxide layer being composed of a Si oxide containing Fe and/or Mn, had a good appearance and good adhesion to the coating.

INDUSTRIAL APPLICABILITY

Steel sheets according to aspects of the present invention have good mechanical characteristics, a good appearance of coating, and good adhesion and are therefore expected to be used in a wide range of applications, such as automobiles, household electrical appliances, and construction materials.

The invention claimed is:

1. A hot-dip galvanized steel sheet having a base steel sheet and a galvanized layer, the base steel sheet having a composition comprising, on a mass basis: C: 0.20% to 0.50%, Si: 0.1% to 3.0%, Mn: 0.5% to 3.0%, P: 0.001% to 0.10%, Al: 0.01% to 3.00%, and S: 0.200% or less, a remainder being Fe and incidental impurities, wherein the base steel sheet includes an internal oxidation layer and a decarburized layer, the internal oxidation layer having a thickness of 0.6 μm or more and 4 μm or less on a ferrite side from an interface between ferrite and a galvanized layer, the decarburized layer having a thickness of 3 μm or more and 16 μm or less on the ferrite side from the interface between the ferrite and the galvanized layer, and 50% or more by area of the internal oxidation layer is composed of a Si oxide containing Fe and/or Mn represented by $Fe_{2X}Mn_{2-2X}SiO_Y$, wherein X ranges from 0 to 1, and Y is 3 or 4.

2. The hot-dip galvanized steel sheet according to claim 1, the base steel sheet further comprising Mo: 0.01% to 1.00% and/or Cr: 0.01% to 1.00% on a mass basis.

3. The hot-dip galvanized steel sheet according to claim 2, the base steel sheet further comprising at least one of Nb:

0.005% to 0.20%, Ti: 0.005% to 0.20%, Cu: 0.01% to 0.50%, Ni: 0.01% to 1.00%, and B: 0.0005% to 0.010% on a mass basis.

4. A galvannealed steel sheet according to claim 3, wherein the galvanized layer is a galvannealed layer.

5. A galvannealed steel sheet according to claim 2, wherein the galvanized layer is a galvannealed layer.

6. The hot-dip galvanized steel sheet according to claim 1, the base steel sheet further comprising at least one of Nb: 0.005% to 0.20%, Ti: 0.005% to 0.20%, Cu: 0.01% to 0.50%, Ni: 0.01% to 1.00%, and B: 0.0005% to 0.010% on a mass basis.

7. A galvannealed steel sheet according to claim 6, wherein the galvanized layer is a galvannealed layer.

8. A galvannealed steel sheet according to claim 1, wherein the galvanized layer is a galvannealed layer.

9. A method for producing a hot-dip galvanized steel sheet, comprising in sequence the steps of:
   hot-rolling steel having the composition according to claim 1,
   cold-rolling the resulting hot-rolled steel sheet;
   heating the steel sheet to a final surface temperature in the range of 550° C. to 750° C. by burning a combustible gas and a combustion-supporting gas with a direct heating burner in a direct heating type furnace, the combustible gas containing CO, a hydrocarbon gas, and a remainder, the CO and hydrocarbon gas constituting 60% or less by volume in total, the remainder being $H_2$, $N_2$, and incidental impurities, the combustion-supporting gas containing $O_2$ and a remainder, the $O_2$ constituting 20% to 40% by volume, the remainder being $N_2$ and incidental impurities;
   heating the steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder; and
   hot-dip galvanizing the steel sheet.

10. A method for producing a galvannealed steel sheet according to claim 9, further comprising alloying the zinc coating after the hot-dip galvanizing.

11. A method for producing a hot-dip galvanized steel sheet, comprising in sequence the steps of:
   hot-rolling steel having the composition according to claim 2,
   cold-rolling the resulting hot-rolled steel sheet;
   heating the steel sheet to a final surface temperature in the range of 550° C. to 750° C. by burning a combustible gas and a combustion-supporting gas with a direct heating burner in a direct heating type furnace, the combustible gas containing CO, a hydrocarbon gas, and a remainder, the CO and hydrocarbon gas constituting 60% or less by volume in total, the remainder being $H_2$, $N_2$, and incidental impurities, the combustion-supporting gas containing $O_2$ and a remainder, the $O_2$ constituting 20% to 40% by volume, the remainder being $N_2$ and incidental impurities;
   heating the steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder; and
   hot-dip galvanizing the steel sheet.

12. A method for producing a hot-dip galvanized steel sheet, comprising in sequence the steps of:
   hot-rolling steel having the composition according to claim 6,
   cold-rolling the resulting hot-rolled steel sheet;
   heating the steel sheet to a final surface temperature in the range of 550° C. to 750° C. by burning a combustible gas and a combustion-supporting gas with a direct heating burner in a direct heating type furnace, the combustible gas containing CO, a hydrocarbon gas, and a remainder, the CO and hydrocarbon gas constituting 60% or less by volume in total, the remainder being $H_2$, $N_2$, and incidental impurities, the combustion-supporting gas containing $O_2$ and a remainder, the $O_2$ constituting 20% to 40% by volume, the remainder being $N_2$ and incidental impurities;
   heating the steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder; and
   hot-dip galvanizing the steel sheet.

13. A method for producing a hot-dip galvanized steel sheet, comprising in sequence the steps of:
   hot-rolling steel having the composition according to claim 3,
   cold-rolling the resulting hot-rolled steel sheet;
   heating the steel sheet to a final surface temperature in the range of 550° C. to 750° C. by burning a combustible gas and a combustion-supporting gas with a direct heating burner in a direct heating type furnace, the combustible gas containing CO, a hydrocarbon gas, and a remainder, the CO and hydrocarbon gas constituting 60% or less by volume in total, the remainder being $H_2$, $N_2$, and incidental impurities, the combustion-supporting gas containing $O_2$ and a remainder, the $O_2$ constituting 20% to 40% by volume, the remainder being $N_2$ and incidental impurities;
   heating the steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder; and
   hot-dip galvanizing the steel sheet.

14. A method for producing a hot-dip galvanized steel sheet, comprising in sequence the steps of:
   hot-rolling steel having the composition according to claim 5,
   cold-rolling the resulting hot-rolled steel sheet;
   heating the steel sheet to a final surface temperature in the range of 550° C. to 750° C. by burning a combustible gas and a combustion-supporting gas with a direct heating burner in a direct heating type furnace, the combustible gas containing CO, a hydrocarbon gas, and a remainder, the CO and hydrocarbon gas constituting 60% or less by volume in total, the remainder being $H_2$, $N_2$, and incidental impurities, the combustion-supporting gas containing $O_2$ and a remainder, the $O_2$ constituting 20% to 40% by volume, the remainder being $N_2$ and incidental impurities;
   heating the steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder; and
   hot-dip galvanizing the steel sheet.

15. A method for producing a hot-dip galvanized steel sheet, comprising in sequence the steps of:
  hot-rolling steel having the composition according to claim 7,
  cold-rolling the resulting hot-rolled steel sheet;
  heating the steel sheet to a final surface temperature in the range of 550° C. to 750° C. by burning a combustible gas and a combustion-supporting gas with a direct heating burner in a direct heating type furnace, the combustible gas containing CO, a hydrocarbon gas, and a remainder, the CO and hydrocarbon gas constituting 60% or less by volume in total, the remainder being $H_2$, $N_2$, and incidental impurities, the combustion-supporting gas containing $O_2$ and a remainder, the $O_2$ constituting 20% to 40% by volume, the remainder being $N_2$ and incidental impurities;
  heating the steel sheet at a soaking temperature in the range of 630° C. to 850° C. in an atmosphere having a hydrogen concentration in the range of 5% to 30% by volume and a water vapor concentration of 0.060% or less by volume and containing $N_2$ and incidental impurities as a remainder; and
  hot-dip galvanizing the steel sheet.

* * * * *